US008196214B2

(12) United States Patent
Farrugia et al.

(10) Patent No.: US 8,196,214 B2
(45) Date of Patent: Jun. 5, 2012

(54) METHOD AND APPARATUS FOR SECURING CONTENT USING ENCRYPTION WITH EMBEDDED KEY IN CONTENT

(75) Inventors: Augustin J. Farrugia, Cupertino, CA (US); Gianpaolo Fasoli, Palo Alto, CA (US); Mathieu Ciet, Paris (FR); Bertrand Mollinier Toublet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 941 days.

(21) Appl. No.: 12/002,098

(22) Filed: Dec. 14, 2007

(65) Prior Publication Data

US 2009/0154704 A1    Jun. 18, 2009

(51) Int. Cl.
*G06F 21/00* (2006.01)
(52) U.S. Cl. ......................................... 726/30
(58) Field of Classification Search .................. 726/30
See application file for complete search history.

(56) References Cited

U.S. PATENT DOCUMENTS

| 7,184,550 | B2 * | 2/2007 | Graunke ..................... 380/42 |
| 7,233,668 | B2 | 6/2007 | Weinstein et al. | |
| 7,477,749 | B2 * | 1/2009 | Pippuri ..................... 380/284 |
| 2003/0185397 | A1 | 10/2003 | Ishiguro | |
| 2004/0139027 | A1 | 7/2004 | Molaro | |
| 2005/0039022 | A1 | 2/2005 | Venkatesan et al. | |
| 2006/0177094 | A1 | 8/2006 | Smith | |
| 2007/0033419 | A1 | 2/2007 | Kocher et al. | |
| 2009/0319770 | A1 | 12/2009 | Thiruvengadam | |

FOREIGN PATENT DOCUMENTS

| CA | 2 649 402 A1 | 11/2007 |
| DE | 10 2006 18 645 A1 | 10/2007 |
| EP | 1 041 823 A2 | 10/2000 |
| EP | 1 041 823 A3 | 10/2000 |
| EP | 1 041 823 B1 | 10/2000 |

OTHER PUBLICATIONS

Extended European Search Report mailed on Apr. 6, 2009, for EP Application 08171401.6, filed on Dec. 11, 2008, 5 pages.
International Search Report mailed on Jul. 10, 2009, for PCT Application No. PCT/US08/12902, filed on Nov. 18, 2008, 1 page.
Written Opinion of the International Searching Authority mailed on Jul. 10, 2009, for PCT Application No. PCT/US08/12902, filed on Nov. 18, 2008, 5 pages.

* cited by examiner

*Primary Examiner* — Nasser Goodarzi
*Assistant Examiner* — Lisa Lewis
(74) *Attorney, Agent, or Firm* — Morrison & Foerster LLP

(57) ABSTRACT

Method and apparatus enabled by computer (or equivalent) hardware and software for protection of content such as audio and video to be downloaded or streamed over a computer network such as the Internet. The content is provided to the user via streaming or downloads in encrypted form. The encryption is such that the content key decryption information is transmitted so that it itself is encrypted to be both device and session unique. That is, the key information can be used only to extract the content decryption key for a particular session and for a particular client device such as an audio or video consumer playing device. This prevents any further use or copying of the content other than in that session and for that particular client. The specificity is accomplished by using a device unique identifier and antireplay information which is session specific for encrypting the content key. A typical application is Internet streaming of audio or video to consumers.

18 Claims, 5 Drawing Sheets

METHOD AND APPARATUS FOR SECURING CONTENT USING ENCRYPTION WITH EMBEDDED KEY IN CONTENT

FIELD OF THE INVENTION

This invention relates generally to copy protection of digital files and more specifically to protecting digital files using encryption, and to key management for that encryption.

BACKGROUND

Systems such as "Apple TV" are well known. Apple TV is a digital media receiver designed and sold by Apple, Inc. It is a networked device intended to play digital content such as audio and/or video provided from any associated Macintosh or Windows client type computer. Typically the client computer is one executing the "iTunes" client. The Apple TV connects to the client computer (which is connected to the Internet for receipt of the video) and stores and plays the video, for instance, on an enhanced definition or high definition television. The Apple TV device stores content which are the audio or video files on an internal hard disk drive. The Apple TV device connects to a television or other video equipment, for instance, through high definition multimedia interface (HDMI) or component video connections. The Apple TV is somewhat similar to the Apple iPod. It is paired with an iTunes library on the client computer and can synchronize with that library, copying content to its own hard disk drive. Thus Apple TV and similar products allow one to obtain, for instance, video materials such as television programs or movies, from an online "store" such as the iTunes Store operated by Apple, Inc. Other such stores also exist. The material provided may be in the form of a download or streaming video or audio. Typically the connection with the store is via the Internet. Of course, other similar products are available which may be integrated with a computer, or are dedicated devices not requiring a general purpose computer but providing the same functionality of obtaining video and audio content via the Internet such as the Apple Inc. "iPhone."

Typically the content provided is protected against misuse. A typical means of this protection is encryption. That is, material as provided to the Apple TV or similar client device is encrypted. A decryption key is conventionally provided so that the material may be decrypted. Managing the keys is a significant technical problem. Obviously if all instances of the downloaded or streamed material have the same key for all users, this is not secure enough since the key could be publicly available. Thus some form of key management is typically provided.

However, satisfactory forms of key management are problematic especially given a large number of users and hence a large number of keys being required. While encryption security in this context need not be airtight, a certain degree of security is necessary since audio and video content have to be protected against hacking.

SUMMARY

In accordance with this disclosure, downloaded or streaming video or audio content is provided in encrypted form to a user via a client device. The material is provided to the device in encrypted form. The associated decryption is such that the decryption (key) information is both unique to the particular device and also to a particular session or connection time. Thus the material as streamed or downloaded to the particular user is not usable, that is, cannot be decrypted, at another time even on the same client device and cannot be used even at the same time on another client device due to the encryption. The copy protection using the encryption is thereby unique in terms of the client and the session. This is especially advantageous for use in the streaming video situation.

As well known, streaming video or streaming multimedia is continuously received by and normally displayed at an end user (client) while it is being delivered by the provider. Typically streaming media is delivered over a telecommunications network such as the Internet. There are well known protocols for streaming media such as real time streaming protocol, real time transfer protocol and real time transport control protocol intended to stream media over networks. These are "on top" of the well known UDP which sends the media stream as a series of small packets. Typically streaming video and audio is compressed using well known compression techniques. The present system is compatible with these protocols but not so limited.

The present system is intended to ensure that if a streaming video, for instance, is recorded, that is, stored by the client, the stored material is as of no use because it cannot be decrypted due to the key management in accordance with this disclosure. Misuse is a well known problem with streaming video since typically the supplier (content provider) intends to prevent recordation or reuse by the original client or by another client. It is well known to make it inconvenient to record a stream by using unpublished data formats or by encrypting the stream.

Note that often in the present commercial environment, downloaded videos such as those sold through the iTunes or other online media stores are made available for storage and replay, at least by a single client. In contrast, other types of videos are typically intended only for streaming purposes and immediate single viewing such as current television programs. One reason for this is that the streaming television programs are provided with advertising commercials, often on a no charge basis, and the content provider expects the viewer to be watching the commercials. Hence the present system is especially suitable for this sort of streaming video or audio situation where portions of the material may be of little or no interest to the user but it is important to the content provider that the user be forced to encounter them. By preventing the user from recording and later viewing the content, that is making the streaming session unique, the problem of commercial skipping is prevented. However, the present system is also applicable to downloads.

Briefly, the present system in one embodiment operates in the context of conventional streaming video over the Internet. A particular audio or video ("asset") such as a television program or movie is compressed using a well known format and then encrypted using a content key as is conventional. The encrypted asset is then posted to a server accessible by users (via the Internet) and downloaded in conventional streaming fashion over the Internet to a client device in which is resident suitable client software. A typical client device is the Apple TV product. Also involved is a gateway server also referred to as an online store as described above which acts as a commercial intermediary between the client and the content provider. However, there is no requirement that any money actually be paid by the user. In some cases the gateway server in this case only has control function and security functions rather than acting as a revenue collection entity.

In any case, rather than simply encrypting the asset with a content key which is provided to the client and which is not very secure, instead the key management is made more complex so that the required key information is both session and client unique. This is done using a combination of key encryption, key decryption, antireplay mechanisms, and altering the key information so that the key needed to decrypt the key itself includes both antireplay information and a identifier unique to each client device. Thereby the streamed material can be successfully decrypted only by a particular client for a particular session. A recorded version of the streaming video would not be decryptable by any other client or even at a later time by the original client. This meets the goal of requiring each individual that wishes to watch a particular streaming video to uniquely stream it from the content provider. This also meets the goal that commercials or other material associated with the streaming material and of little (or less) interest to the client user must be encountered by the client user while he views the streaming material itself. Hence this copy protection is especially useful in the environment of, for instance, television programs or movies with associated commercial messages.

DETAILED DESCRIPTION

Figure 1:
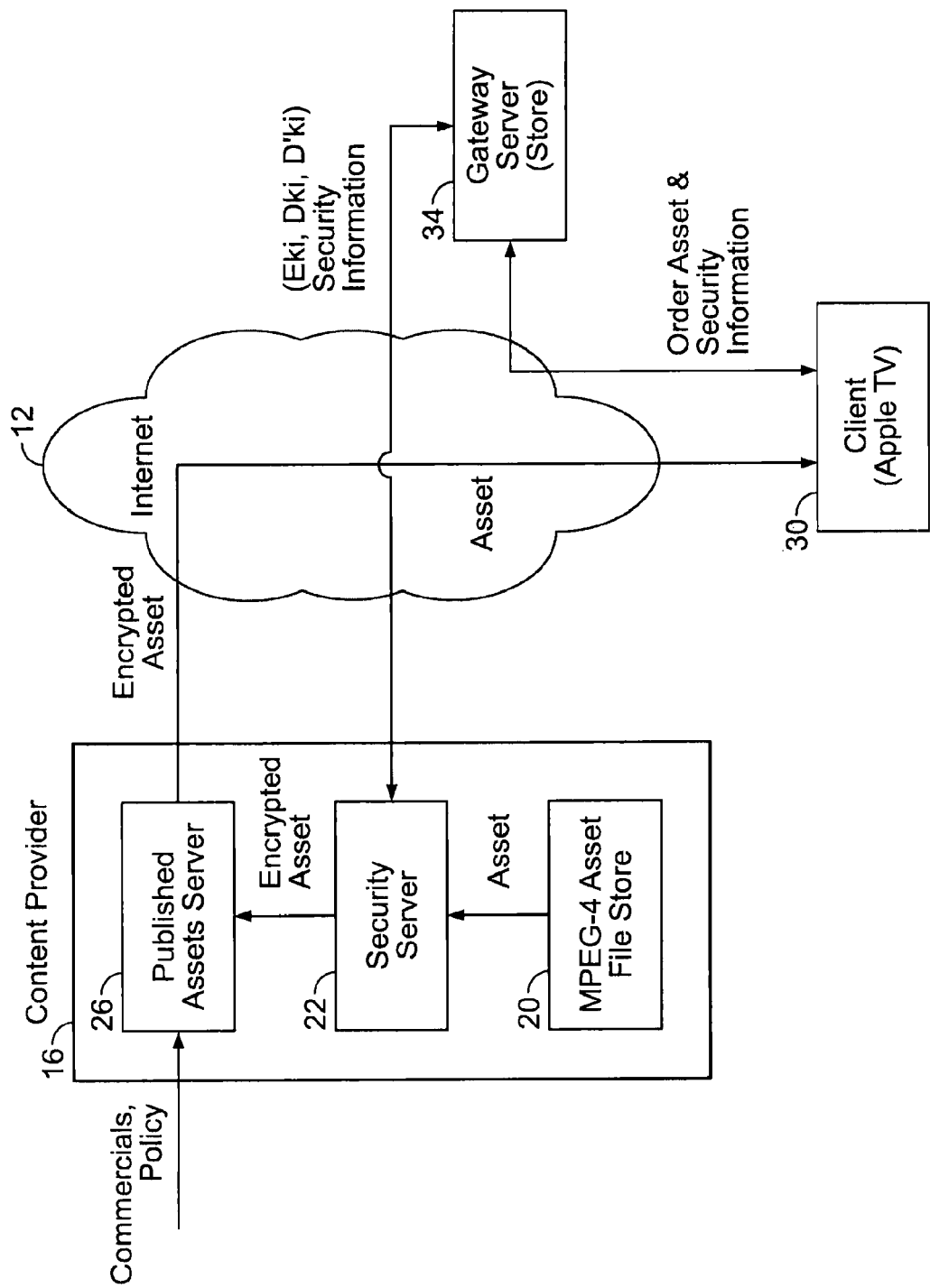
FIG. 1 shows a system in which the present method can be carried out with the associated computer implemented entities.

FIG. 1 shows in a block diagram the environment in which the present method and apparatus operate. This is generally in the form of a computer implemented network with the Internet 12 being the communications channel. The protocols used for communications there over are described above and conventional in the field of downloads and streaming content such as digital files including audio, video and other types of data. The method and apparatus disclosed here are not limited to streaming or to audio and/or video, but are generally useful for protecting data. To the left hand side of the Internet 12 in FIG. 1 is the content provider entity 16. This is not per se an apparatus, but is an entity such as, e.g., a commercial entity such as a movie studio, television network, etc. Content provider 16 has under its control a file store 20, typically a computer server, on which are stored a large number of content assets. The file store 20 stores, for instance, a large number of videos, audios, television programs, movies, etc., each in typically in some well known format such as the MPEG-4 compressed format, although the compression is not a requirement. These stored files are "in the clear" that is unencrypted and in this state are for the internal use of the content provider.

As explained further below, each asset (a video or television program or movie) is one-by-one transmitted over a secure communications channel under control of the content provider 16 to a security server 22, the functionality which is described below. One function of the security server 22 is to conventionally encrypt the asset using a content encryption key as further described below. The mere routine encryption of an asset using a content key is well known. Exemplary types of encryption that are suitable are further described below. The encrypted asset is later provided over another secure communication channel to a published asset store (server) 26. This particular server 26 is accessible via the Internet 12 by conventional connections as is, e.g., an Internet cache host or a streaming server. As explained further below, the encrypted asset is eventually streamed (or in some embodiments downloaded) from the published asset server 26 via the Internet. As shown, this encrypted asset is transferred ultimately to a client device 30 such as an Apple TV device. Device 30 is a hardware device with resident client software which chiefly operates, as does any conventional client, for playing streaming video and that also has the security aspects further described herein for decryption, since the asset is distributed in an encrypted form.

Client 30 is connected typically also via the Internet 12 to what is referred to here as a gateway server ("gateway") 34. Server 34 is another server (computer platform) with resident software as described further herein. Most of the operations of gateway server 34 are those carried out by a typical online or Internet media/audio/video commercial vendor such as the iTunes Store operated by Apple Inc.

In accordance with this disclosure, the gateway server carries out security functions in terms of providing security information for the asset decryption and encryption to the client 30 and to the security server 22. The security information as shown here includes encryption information $Ek_j$, decryption information $Dk_j$, and altered decryption information $D'k_j$. This is explained further below. Note that most of the functionality shown in the FIG. 1 system for downloading and/or streaming video is conventional and not described here in any detail. The remainder of this disclosure focuses on the security features for protecting the assets. Note that while here the security server 22 is shown as being under the control of the content provider entity 16, this is not necessarily the case and the security server 22 could be operated by another entity or supplied by another entity. The interaction between the security server 22, the gateway server 34 and the client 30 constitute the security transactions in accordance with this disclosure for protection of the assets.

The term "server" is used in its normal meaning in the computer field. It refers generally to a computer connected to a network such as the Internet. Typically the computer includes memory such as a hard disk which stores data and other types of files. The server computer, otherwise known as a platform or hardware, executes particular server software which carries out the server function. Servers of this type embodied in hardware and software are available from a number of well known vendors and are routine in the field of computer networks.

The nature of the client is also described above. Generally the term "client" here refers to a consumer electronics device (including a computer) which executes client software and connects to the Internet, either directly or via a client computer (not shown) for in this case obtaining video and/or audio files (assets).

Gateway server 34 is another server and typically includes a large number of actual servers, all interconnected and operated by a vendor of content such as the iTunes store operated by Apple, Inc. Generally the description here does not specify how the actual assets are transferred or used since that is routine in the field. Also note that there may be other security aspects in the FIG. 1 system since such content typically protected by what is called in the field DRM (Digital Rights Management), which provides, in addition to content encryption, various other types of protective mechanisms to prevent content misuse.

The following explains operation of the FIG. 1 system in two parts. The first part is transactions between the client 30 and the gateway server 34, that is the client side (see FIG. 2). The second part is transactions between the gateway server 34 and the content provider 16 (see FIG. 3). However, note that these are interleaved in time and that the activities on one side do not all occur before the other. However, in each of FIGS. 2 and 3 the activities occur generally in the order shown within each figure.

Figure 2:
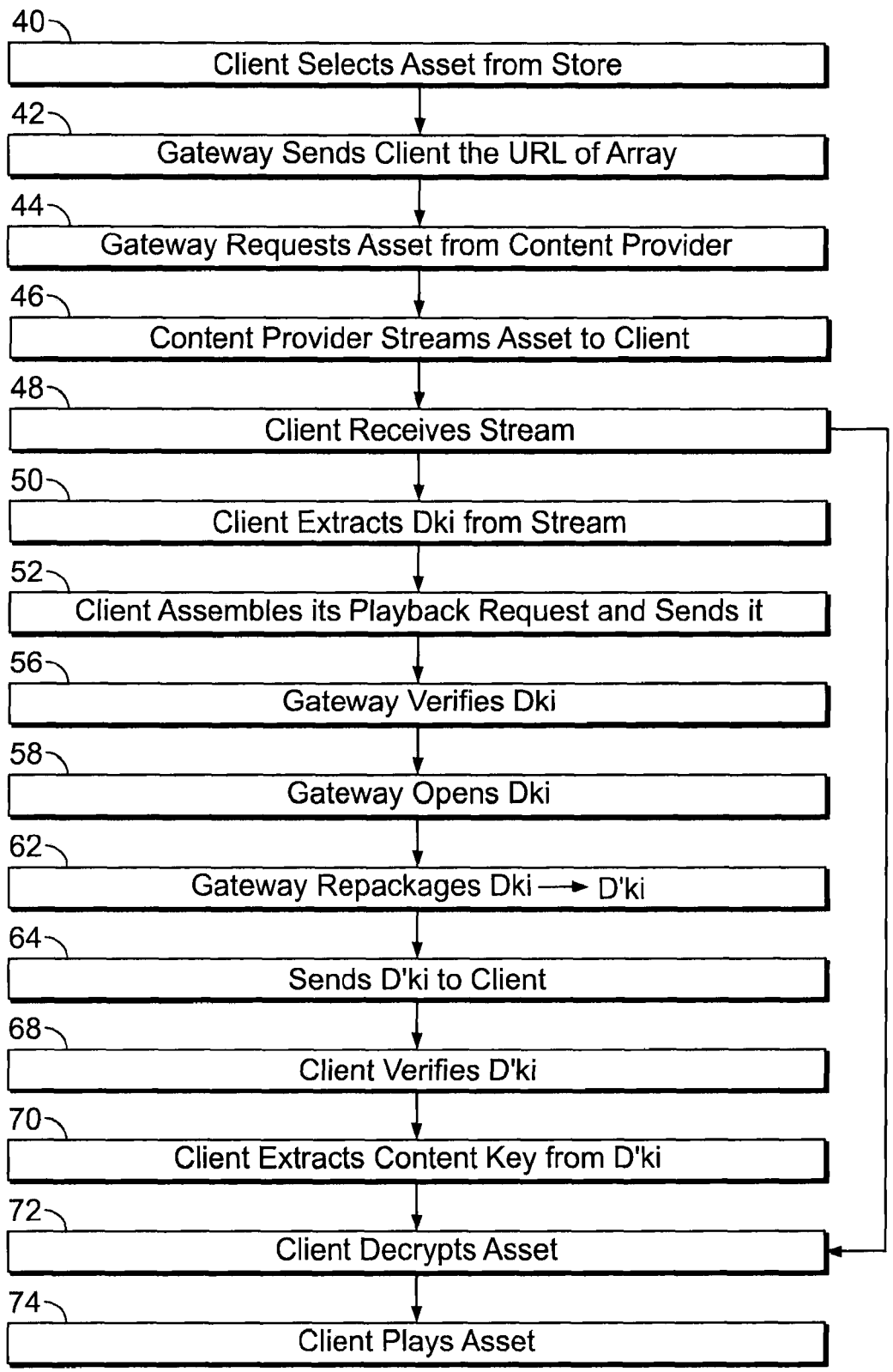
FIG. 2 shows in a flow chart the sequence of action in accordance with the present method in the streaming or other download process between the client device and the gateway or online store.
Figure 3:
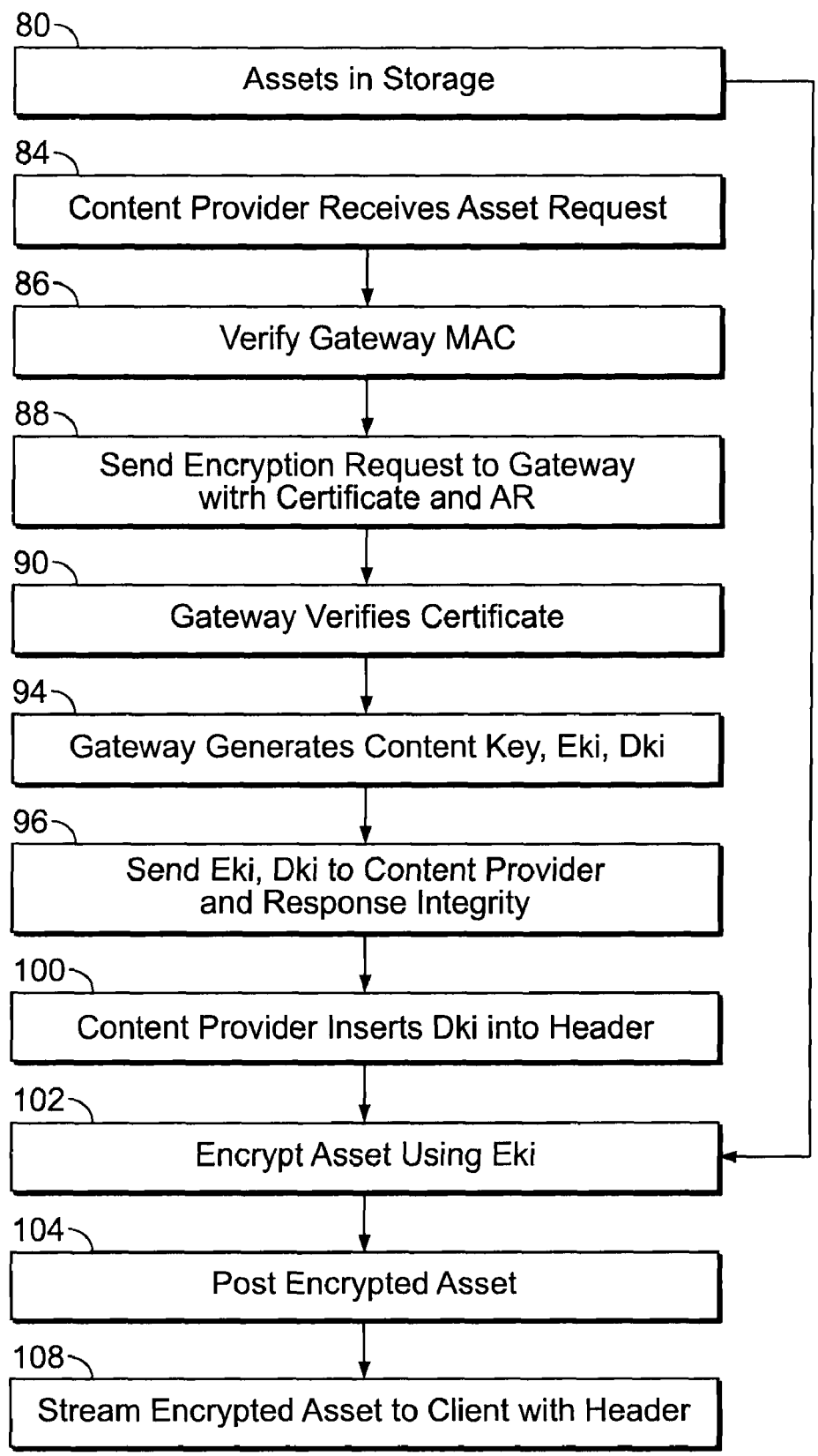
FIG. 3 shows in a flow chart the sequence of actions in accordance with the present method between the content provider and the gateway or online store.

Each of the elements shown in FIG. 1 which include the security server 22, the gateway server 34 and the client 30 execute resident software which carries out, in combination, the functionality of FIGS. 2 and 3. Therefore this system requires what is referred to generally as a "compliant" client 30 to carry out the functionality of FIGS. 2 and 3 and similarly compliant servers 22 and 34, so these, while they are based on conventional software and hardware, have been modified (typically in terms of the software) to perform the functionality and operations described herein.

Generally therefore each of these elements includes a computer program also referred to as code or software code or software which is a series of computer instructions. Programming the code for each of these elements to carry out this functionality is well within the skill of one of ordinary skill in the art in light of this disclosure. Typically the software is coded in the C or C++ computer languages or other similar languages. The servers 22, 34 and client 30 typically store only compiled versions of this code, that is the machine or object code, which is also conventional in the field. Moreover, the system is subject to other software security approaches such as, for instance, code obfuscation to prevent hackers from reverse engineering or understanding the software, especially the client 30 software. The security server 22 and the gateway server 34 typically are under control of commercial entities who are interested in protecting the content. In some situations (as in FIG. 1) the security server 22 is under separate control than is gateway 34 and therefore the security server 22 software may also be subject to protection to prevent tampering by content provider 16. In some cases the security server 22 is actually supplied to the content provider 10 by the entity that operates or owns the gateway server 34.

Therefore FIG. 2 depicts in flow chart form the operations in terms of security occurring between the client 30 and the gateway server 34. At 40 the client (actually the user of the client, who is a person) selects an asset from the online "store" which is part of the gateway server 34. For instance this is the iTunes Store and is accessed by the conventional iTunes client software resident on the client 30. This selection involves the client forming an Internet connection with the gateway server 34 and then accessing a web page menu which lists all content available from gateway server 34. The client user typically selects an item (asset) by clicking on its place in the menu, indicating an interest in obtaining the item. When the client user browses the iTunes store at gateway 34 upon selection of the particular item of content such as a movie or television program, the client 30 device informs the gateway 34 of its GUID and what content it wishes to view, sometimes referred to as the item identification. This operation initiates a synchronous channel between the gateway and the client which, for instance, is a conventional http/tcp connection.

At 42 in response the gateway 34 transmits to the client 30 the Internet location Universal Resource Locator (URL) of the asset at the server 26. This URL is a typical Internet type address. It typically references a content item to be stored in the published assets store 26, further described hereinafter. In more detail, the gateway 34 transmits back along the synchronous channel the asset information which is, for instance, in the form of an XML message of the type well known in the computer field containing a URL to the encrypted asset (the streaming URL), a URL to the asset's commercials (a download URL) and a URL to the policy (also a download URL). The client 30 is told from where to fetch the content by following or downloading this streaming URL. This streaming URL may point to a server under control of the content provider or to a hosting server. This XML message may be signed and if that is the case, the client 30 verifies the signature. Typically this is an RSA signature verified with an X509 certificate. Since the XML is being sent by the gateway server, it should be the gateway server's certificate and it is generally the gateway that computes this signature which is for instance a conventional RSA type signature. Note that the downloaded policy is later verified and enforced as of the start of playback at the time of decryption by the client as described further below. At 44 the client requests from the content provider 16 the particular selected asset by passing the item identification of the selected asset to the content provider. At 46 the content provider 16 begins to transfer (e.g., stream) the encrypted requested asset, which is a video or audio typically, to the client from published assets server 26. These assets are each encrypted as further described below. This is a routine Internet enabled transfer of content.

The downloaded policy is a set of rules which describe how the associated downloaded commercials should be played, at what times they should be played in the asset, and whether the user of the client can skip and/or fast forward through the commercials. The nature of the policy can be determined by the gateway 34, the content provider 16 or other entities. Note that in this case the commercials are not per se part of the published asset, that is, they are usually not encrypted. Moreover, typically the commercials are not subject to streaming, but are downloaded. Of course, there is no reason to provide security for the commercials since copying or recording of same is unlikely (and even desirable). Typically the policy ensures that the asset when played by the client must include the commercials. As pointed out above, it may be allowed that the user can skip or fast forward through the commercials but typically the policy does not allow this. Hence the commercial file management is not subject to the security aspects as described herein and is essentially conventional. Therefore there will be no further description here of the commercials or their use or the policy. It is understood that commercials are each played during a pause in the content, e.g. a movie.

At 48 the client 30 receives via the Internet 12 (which is the communications network here) the asset as a streaming audio or video or other form. Streaming is not required; this transfer may be a download in other embodiments, but streaming is preferred because it reduces the chance of tampering or hacking with the asset. The policy and commercials are also distributed to the client at this time via downloads from their server (not shown).

The asset includes, typically as a header file or a header, certain key decryption information designated here $Dk_i$. This key information is needed for the decryption by the client of the encrypted asset. As soon as the client has streamed enough of the asset it extracts there from the decryption information $Dk_i$. The client extracts this decryption information $Dk_i$ from the asset header which itself is typically not encrypted. In one embodiment the decryption information $Dk_i$ is a generic protected version of the content (asset) decryption key. This content key is the key required to decrypt the asset and (in the case of a symmetric cipher) is also used by the security server 22 to encrypt the plain text content from asset store 20. In one embodiment the encryption technique is the well known AES encryption which is a commercially available symmetric cipher. Of course, use of AES is not limiting. For instance, the content may be encrypted using other symmetric (private key) ciphers or public/private key encryption of the type provided commercially by RSA. In this example to express this logically, the decryption information $Dk_i$=AES_encrypt (key =gateway key 01, data=content key). In other words, in this case the decryption information $Dk_i$ has as its kernel (data) the content key. In this case the asset is encrypted with the same content key for all audio and video streams, and the content key is not session specific or device specific in terms of the client. That is, there is typically only one version of the published asset held in the published asset server 26 and this is encrypted with the content key which is typically an AES type encryption/decryption key.

The gateway keys 01, 02, etc. are AES keys generated by the gateway server 34 and stored there. They are used to encrypt the content key, that is to produce the value $Dk_i$. The gateway key number i (index) is one out of n possible 128-bit AES gateway keys. The intention is not to encrypt each content key with the same AES gateway key since that poses a security risk in case of compromise. One way to solve this is to have a set of n possible 128-bit AES keys stored in memory in the gateway server and randomly or rotationally pick one out of n each time the gateway has to create a set of $Dk_i$ decryption information. Also, the $Dk_i$ decryption information is signed (via a conventional digital signature) by the gateway server 34 when the gateway server generates $Dk_i$.

Next at 52 the client having extracted the $Dk_i$ information assembles playback request which includes the decryption information $Dk_i$, antireplay information AR, and the client GUID (global unique identifier) and sends it to the gateway. Antireplay is a well known technology used to make content downloads and stream session specific. It typically involves some session unique aspect such as a random number or a time stamp. There are many known generic and proprietary antireplay (AR) mechanisms suitable for use herein. AR information conventionally guarantees that a session is intact. If the upstream and downstream antireplay information differs, the session is considered broken or compromised and is terminated. It is a value or designator uniquely associated with the client. An example of this is a device MAC (Media Access Control) address. It serves in effect as a unique serial number for each client. The combination of the antireplay information AR and client GUID renders the playback request both session and device specific.

At 56 the gateway verifies the decryption information $Dk_i$ by, e.g., a conventional RSA digital signature verification. After verifying the integrity and authenticity of decryption information $Dk_i$ at 58, the gateway extracts the decryption information $Dk_i$ and decrypts it to extract there from the content key by means of AES decryption.

At 62 the gateway server "repackages" or alters the decryption information $Dk_i$ to a new form $Dk'_i$. Expressed in logical form as above, $Dk'_i$=AES_encrypt(key=GUID+AR, data=content key). Thus $Dk'_i$ is in effect the content key which is the data, encrypted using as a key the string which is a derivation or concatenation of the client GUID with the session AR information to produce a 16 bit AES key. This key length and the use of AES are merely illustrative.

Then at 64 the gateway server sends this "repackaged" value of $Dk'_i$ back to the client.

Then at 68 in FIG. 2 the client verifies the repackaged decryption information $Dk'_i$. This is typically an HMAC_SHA1 integrity check or done implicitly by decryption since the GUID and AR information are unique to that client and session. After verifying, the client performs the inverse (decryption) operation to extract the content key=AES_decrypt(key=GUID+AR, data=repackaged $Dk_i$). This is identical to the key derivation or concatenation function as performed at 62. In some embodiments for this key derivation the inputs are combined and the various bytes are shuffled or moved around using other known cryptographic functions such as SHA1 or AES as well as, for instance, expansion reduction and entropy generation functions. This increases overall system security so that the session and device unique aspect of the decryption information are difficult for a hacker to break. Then having possession of the content key the client decrypts the asset (which is already streaming into it) using the content key. Typically this content encryption is also AES although that is not required and other types of encryption may be used. At 74 then the client plays the asset for the user in the decrypted form as it streams in. Some form of buffering is provided at the client so that the decryption can take place more or less in real time along with the streaming. This is routine in the field.

Turning to FIG. 3, this shows activity on the content provider and gateway side of the transactions described above with regard to FIG. 2.

Beginning at the top of FIG. 3 at 80, before any of the activity that takes place in FIG. 2, the various assets which are typically videos (television programs or movies) or audios are provided conventionally in the form of "in the clear" digital files at server 20. Typically these videos are in the form of MPEG-4 compressed video files. For instance, this is the .m4v file extension for videos sold by Apple, Inc. Note that MPEG-4 files are organized into tracks. Typically each track's data samples are encoded (compressed) with a specific codec dependent on the media type, for instance, H264 for video and AAC for the audio. In one embodiment each data track in each asset is then encrypted individually, that is, with a different content key. Thus the encryption follows the following equation: for each data sample encrypted_data_sample=AES_encrypt(key=content key, data=plain_data_sample). This is encryption routine. (Hence reference to a "content key" here may refer to a plurality of content keys for each asset.) This encryption takes place in FIG. 1 when the MPEG-4 assets are transferred to the security server 22 which performs this encryption. The encrypted asset is then downloaded to the published asset server 26 where it resides at a particular URL awaiting streaming. The policies and commercials are also posted to the same server 26 (or a separate server) at their URLs at this point so that they are associated with each asset. In other versions the commercials and policy are supplied by the gateway server 34.

In any case, returning to FIG. 3 the initial step is at 80 where the assets are originally in the plain or clear form. The first security related step in FIG. 3 is at 84 where the file store 20 of the content provider receives the asset request from the client for a particular asset. The security server 22 is conventionally provided with an X509 certificate. This is a well known security feature in the computer field and the certificate is issued by a PKI certificate authority. Typically this authority is controlled by the entity operating the gateway server 34 although this is not required. The reason for this is that in the particular configuration shown in FIG. 1 the security server 22 is under control more or less of the content provider, but the operator of the gateway server, which is typically a different commercial entity, may want to ensure the authenticity of the security server 22. Of course, this is not required in other embodiments. Next at 88 the security server 22 sends its encryption information request including its antireplay information AR generated by security server 22 to the gateway and including the X509 certificate of server 22. At 90 the gateway conventionally verifies this certificate. After verification, the gateway server at 94 generates or accesses the content key, and from that generates encryption information $Ek_i$ and decryption information $Dk_i$. The content key may have been generated earlier. This encryption information $Ek_i$ is a content provider specific and session specific protected version of the content key CK and is expressed logically as:

$Ek_i$=AES_encrypt(key=server22_GUID+AR, data=content key).

(Note that this value of $Ek_i$ concatenates the GUID and AR information, but this is merely illustrative; the GUID and AR information may be combined using any bijective operation.) Hence this is similar to the key protection information $Dk_i$ explained above where a GUID and antireplay information are used as a key to encrypt the data which is the content key using, e.g., AES encryption. In this case, however, the GUID is that of the security server 22 and the antireplay data is generated by the security server 22 hence not being the same as the antireplay information on the client side. Again, use of AES encryption here is merely illustrative. Alternatives to AES include an X507 certificate, RSA encryption, etc. In general this process is client driven. Note that the content provider never accesses or has access to the client GUID. An advantage of this is that the gateway server can track how many playback requests are processed.

The gateway server at this point also generates the decryption information $Dk_i$ as explained above. Then at 96 the encryption information $Ek_i$ is sent to the security server 22 as an encryption information response. At the same time the decryption information $Dk_i$, which is signed digitally for instance by a conventional RSA signature by the gateway server, is also sent to the security server 22. At 100 the security server verifies the signature, and if the verification succeeds inserts the decryption information $Dk_i$ into the asset header for the particular requested asset. Therefore this fits in with the flow of FIG. 2 since the asset header must include the $Dk_i$. At 102 the security server 22 encrypts the asset using the content key it extracts from $Ek_i$. Thus the content encryption occurs only at this time. This process decrypts $Ek_i$ using the key which is the security server GUID+the security server AR information to decrypt the encryption information thereby to extract the content key, and uses the content key to encrypt the asset as explained above. Expressed logically, content key=AES_decrypt(key=server_GUID+AR, data=$Ek_i$). Then at 104 the asset in its encrypted form (encrypted with the content key) with its header with $Dk_i$ is posted (published) on server 26. Note that the content key (or set of content keys) does not change for each session or client; it may be the same over many streams.

Next at 108 (corresponding to action 46 in FIG. 2) as soon as the asset request from the client is received, see 44 in FIG. 2, the published asset server 26 begins streaming the encrypted asset to the client including, of course, the $Dk_i$ information in the asset header. Note that the content must be encrypted and published to asset server 26 in order to be available to the client when the client browses the content menu maintained by the store at 40 in FIG. 2.

Note that $Ek_i$ and $Dk_i$ when transmitted from the gateway server to the content provider are protected by AR information. This is done using an integrity computation. After $Ek_i$ and $Dk_i$ are each generated separately the gateway server 34 computes the integrity field of its response as follows: Response_integrity=HMAC_SHAI(key=AR, data=concatenate($Ek_i$, $Dk_i$)). This response is at step 96 in FIG. 3, from gateway 34 to security server 22. Thus the gateway server creates its response and transmits it to the security server 22. The response is the concatenated set of values $Dk_i$, $Ek_i$, response_integrity.

Upon reception of the response, the security server 22 performs the same integrity computation with the first two fields and compares the results to the third field in the response. If they match then the response message has not been tampered with or replayed. Use of HMAC_SHAI (a well known hash function) as the verification function here is illustrative; other well known hash or HMAC functions may also be used for verification.

Note with regard to the antireplay information (AR), some of it originates at the content provider and some at the client. Typically this information is selected to be at least partly random for every exchange and is always generated by the party initiating the exchange. In the key encryption case this party is the content provider. For the playback (key decryption) case this party is the client. Also, the particular system configuration of FIG. 1 is not limiting; various of the illustrated elements may be regrouped or under control of other entities, or combined.

Figure 4:
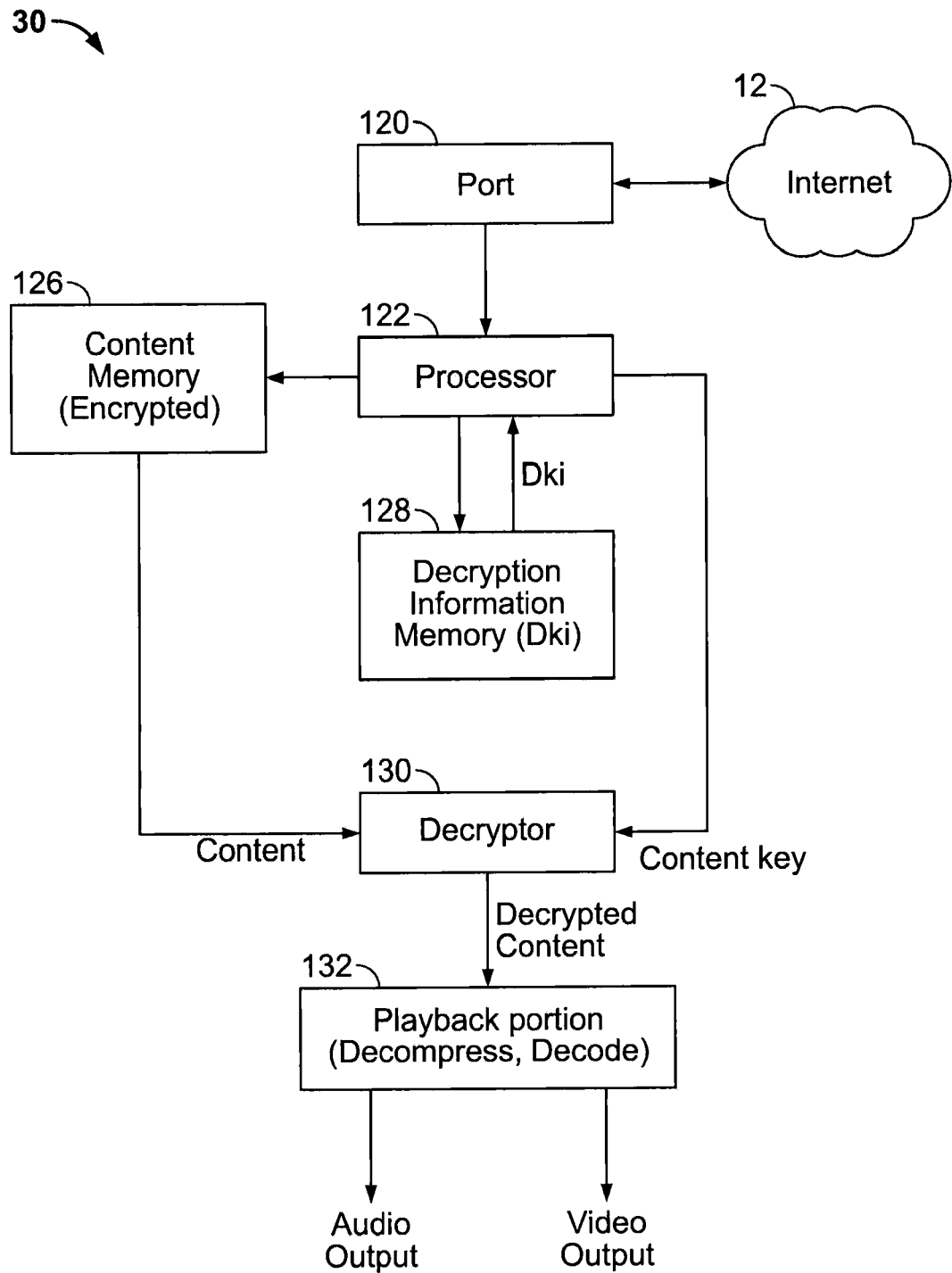
FIG. 4 shows the client of FIG. 1 in a block diagram.

FIG. 4 shows the client 30 in a block diagram including conventional Internet port 120 coupled to a processor (logic) 122. Content memory (storage) 126 is e.g. a hard disk drive or flash memory or equivalent storing the incoming encrypted content as directed there by processor 122. The incoming decryption information is stored in memory 128, also coupled to processor 122. Decryptor 128 is coupled to the content memory 126 and also to receive the content key from processor 122, as extracted from the stored decryption information. The resulting decrypted content is provided to conventional playback portion 132 which decompresses and decodes the content and outputs the audio and video signals to respectively a loudspeaker or headphones and a video display.

Figure 5:
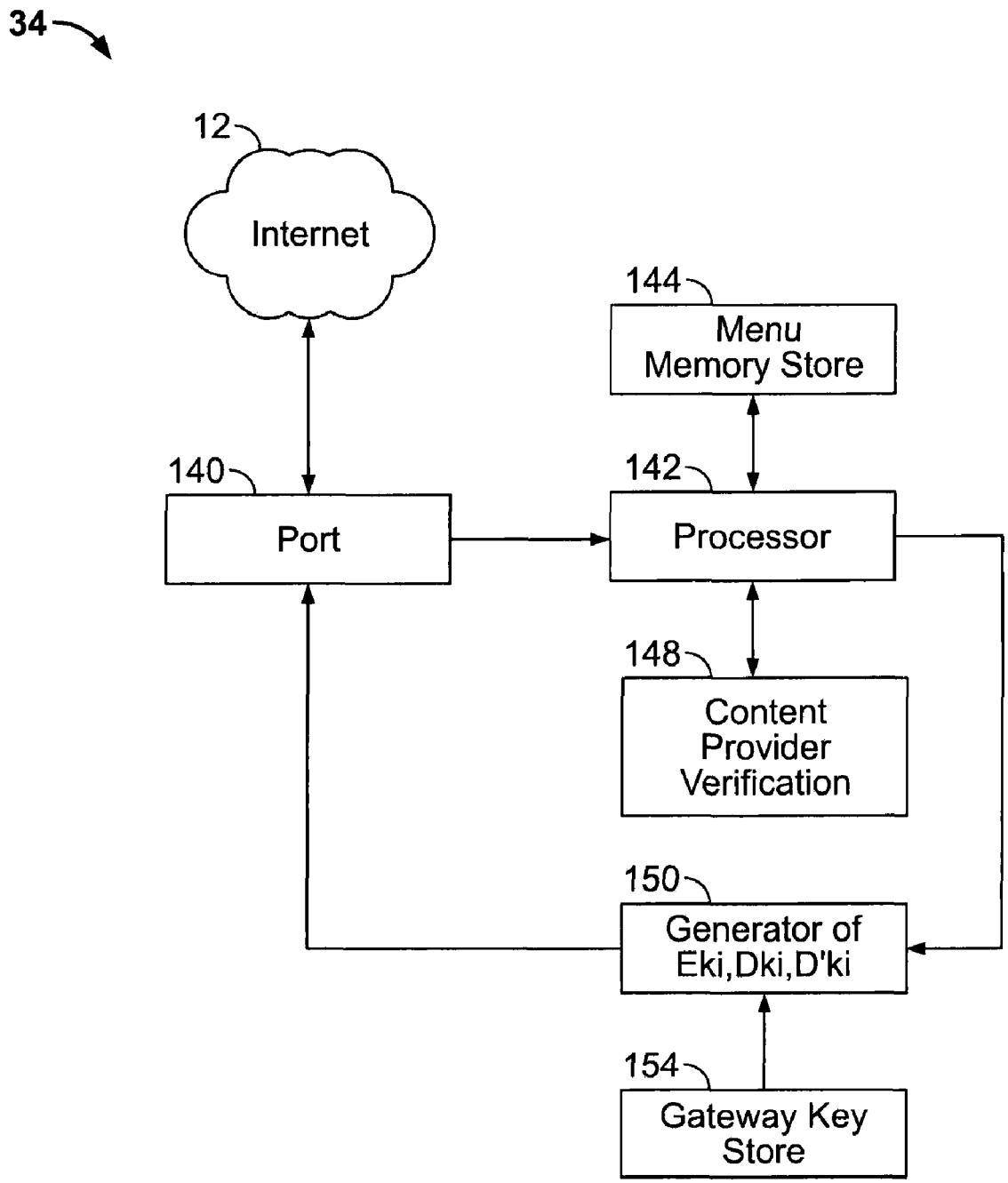
FIG. 5 shows the gateway of FIG. 1 in a block diagram.

FIG. 5 shows the gateway 34 in a block diagram including Internet port 140 and processor (logic) 142, coupled to the "store" 144 which provides the content item menus and accepts orders from the clients. Content provider verification portion 148 verifies the content provider as described above for each session. Under control of processor 142, the encryption/decryption information generator 150 is coupled to the gateway key storage memory 154, and uses the stored gateway keys and the other data as described above to generate the encryption information, the decryption information, and the repackaged decryption information.

This disclosure is illustrative but not limiting. Further modifications will be apparent to those skilled in the art in light of this disclosure and are intended to fall within the scope of the appended claims.

What is claimed:

1. A computer implemented method for receiving encrypted content at a client, in a session, comprising the acts of:
   receiving as a streaming audio or video at least a part of all the encrypted content item at the client;
   receiving initial information for decryption of an encrypted content item at the client, the initial information including a content key not specific to the client and which is encrypted by a first key;
   storing the at least part of the encrypted content item in a first memory;
   transmitting a request including the initial information, session unique data and data associated with an identification of the particular client, after receipt of the streaming audio or video;
   receiving, in response to the request, second information for decryption of the item at the client, the second information including the content key for decryption of the item, the content key being encrypted;
   storing the encrypted content key in a second memory;

decrypting the encrypted content key in the second information by a second key which is a function of the session unique data and the data associated with an identification of the particular client; and decrypting the received content item, using the decrypted content key.

2. The method of claim 1, wherein the second key is a key for a symmetric or asymmetric cipher.

3. The method of claim 1, wherein the session unique data includes an anti-replay value.

4. The method of claim 1, wherein the data associated with a particular client is a MAC address or globally unique identifier.

5. The method of claim 1, further comprising the act of:

after receiving the content item, the client receiving verification information.

6. The method of claim 1, wherein a server is connected to the client and a source of the content item, and further comprising the server generating the second decryption information.

7. The method of claim 1, wherein the content item is partitioned into a plurality of portions, each portion being decrypted by a different content key.

8. The method of claim 1, wherein the information for decryption is digitally signed, and further comprising verifying the digital signature.

9. Apparatus for playing content supplied from a content provider in a session, comprising:

a first memory for storing as a streaming audio or video at least a part of an encrypted content item;

a second memory for storing initial information for decryption of an encrypted content item, the initial information including a content key not specific to the client, and which is encrypted by a first key, and a second information for decryption of the content item, the second information including the content key for decryption of the content item, the content key being encrypted;

a processor coupled to the first and second memories and adapted to transmit a request including the initial information, session unique data and data associated with an identification of the particular apparatus, after receipt of the streaming audio or video;

a decryptor coupled to the first and second memories, wherein the decryptor decrypts the content key in the second information by a second key stored in the second memory and which is a function of the session unique data and the identification of the particular apparatus;

the decryptor being adapted to decrypt the content item using the content key; and a playback portion coupled to the decryptor for playing the decrypted content item.

10. A computer implemented method of transferring encrypted content as a streaming audio or video from a content provider to a client, in a session, comprising the acts of:

receiving a request from the content provider to provide information for encryption of a content item;

generating initial information for decryption of the content item, the initial information including a content key not specific to the client, and which is encrypted by a first key;

transmitting the initial information to the client;

at a port receiving a request to decrypt the content item from the client after at least a part of the audio or video is received by the client; the request including the initial information and session unique data and data associated with an identification of the particular client;

altering at a processor coupled to the port the content key for decryption upon receipt of the initial information; and transmitting the altered content key to the client, wherein the altered content key is encrypted by a second key which is a function of the session unique data and the data associated with an identification of the particular client.

11. The method of claim 10, wherein each content and second key is for a symmetric or asymmetric cipher.

12. The method of claim 10, wherein the session unique data includes an anti-replay value.

13. The method of claim 10, wherein the data associated with a particular client is a MAC address or global unique identifier.

14. The method of claim 10, wherein the request for the encryption information includes the session unique data.

15. The method of claim 10, wherein the method is performed by a gateway server connected to the client and the content provider.

16. The method of claim 10, wherein the content item is partitioned into a plurality of portions, each portion being encrypted by a different content key.

17. The method of claim 10, further comprising digitally signing the information for decryption.

18. Apparatus for transferring security information relating to transmitting as a streaming audio or video at least a part of an encrypted content item to a client, comprising:

a memory storing a content key;

a processor coupled to the memory;

a generator coupled to the memory and to the processor, and which generates initial information for decryption of the content item, the initial information including the content key, which is not specific to the content item, and wherein the generator further generates in response to a request from the client including the initial information and session unique data and data associated with an identification of the particular client, an altered content key for decrypting the content item, the altered content key being encrypted by a second key which is a function of the session unique data and the data associated with the client, wherein the second key is transmitted to the client after transmission of the at least part of the encrypted content item.

* * * * *